July 21, 1925.
E. M. CHASE
1,546,435
FEEDING MECHANISM FOR CANDY COATING MACHINES
Filed July 13, 1923  2 Sheets-Sheet 1
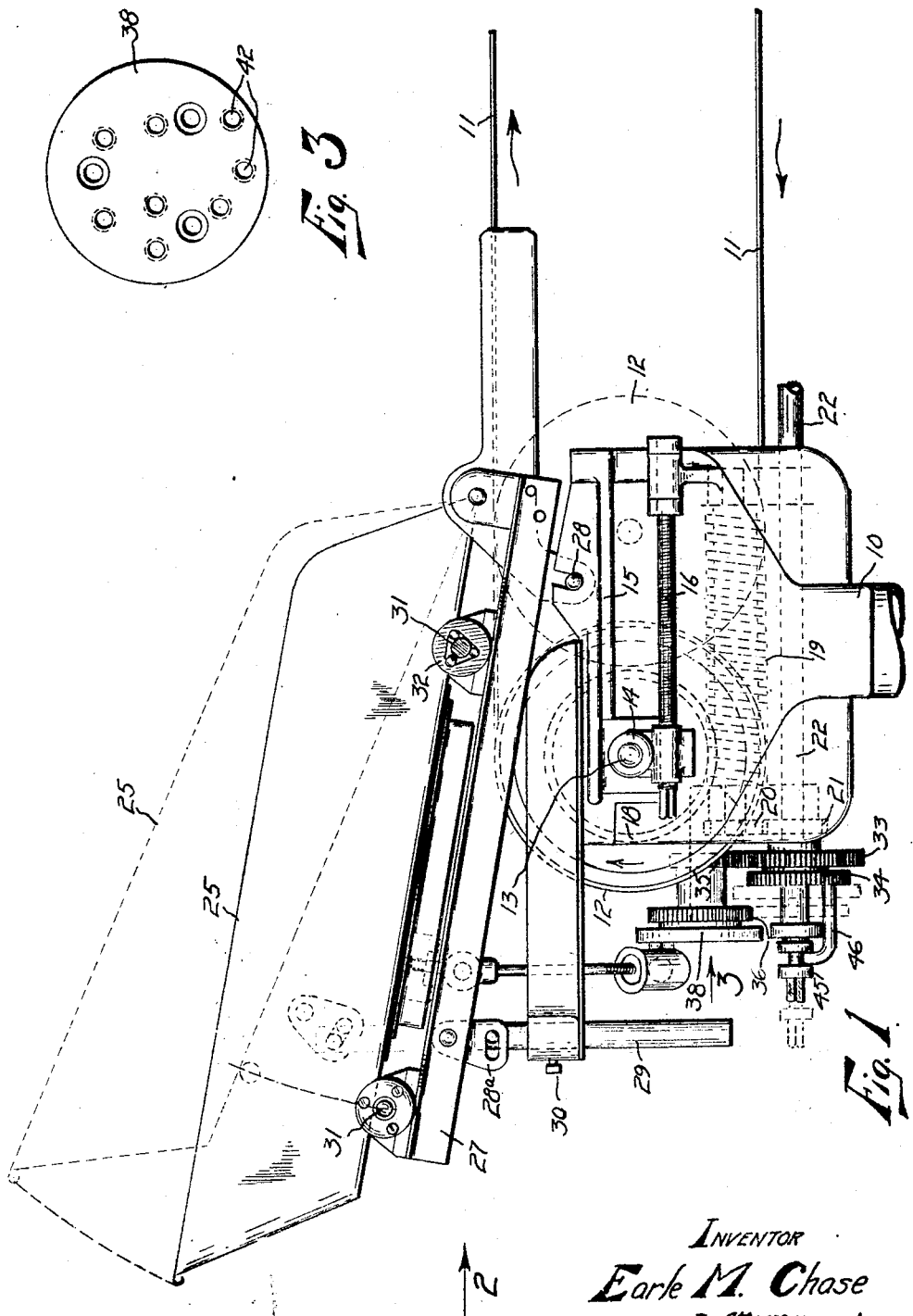
INVENTOR
Earle M. Chase
By Attorneys
Southgate & Southgate

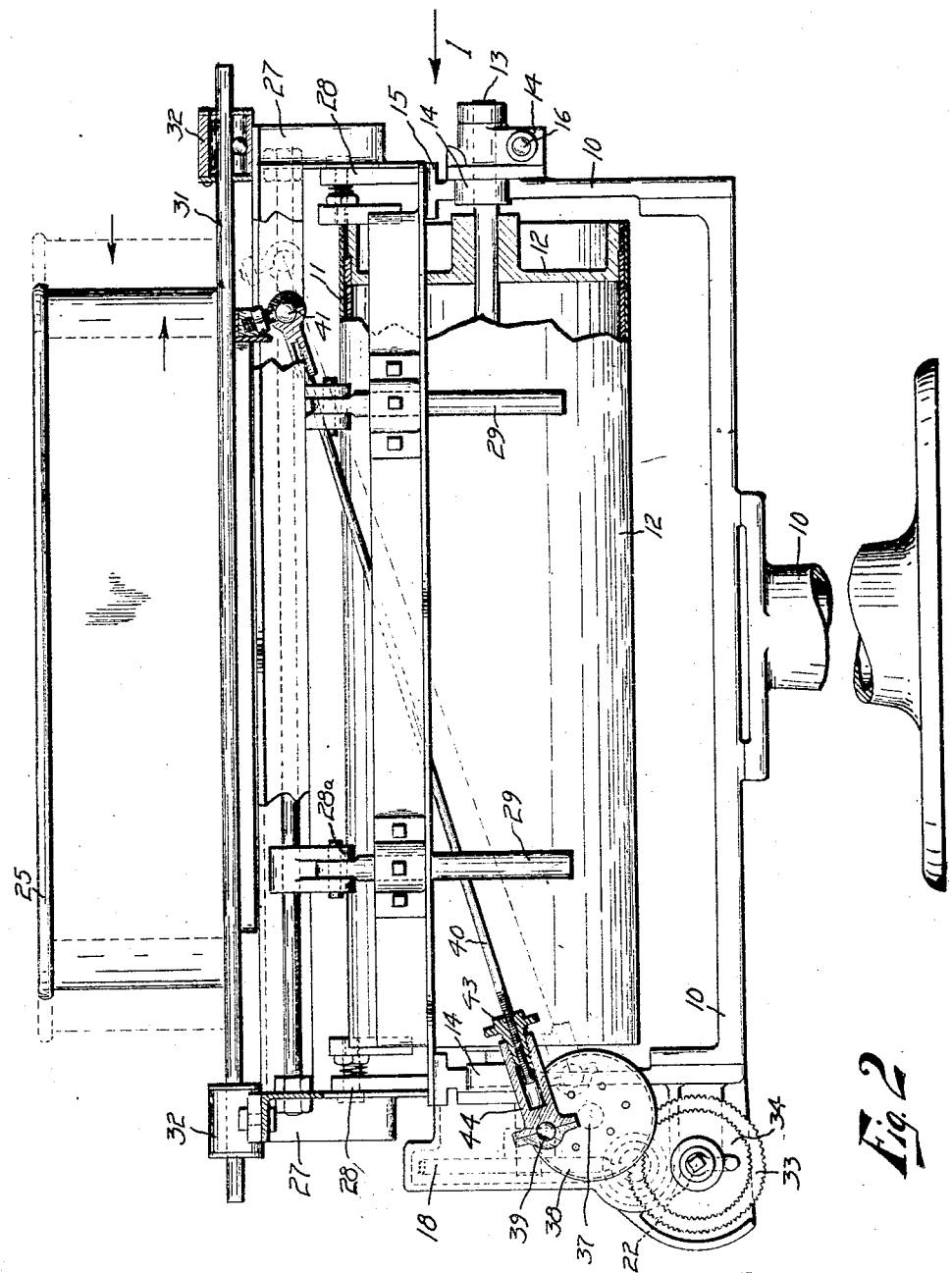

Patented July 21, 1925.

1,546,435

UNITED STATES PATENT OFFICE.

EARLE MERRITT CHASE, OF SPRINGFIELD, MASSACHUSETTS, ASSIGNOR TO UNIVERSAL CANDY AND CHOCOLATE MACHINERY COMPANY, INC., OF SPRINGFIELD, MASSACHUSETTS, A CORPORATION OF MASSACHUSETTS.

FEEDING MECHANISM FOR CANDY-COATING MACHINES.

Application filed July 13, 1923. Serial No. 651,274.

*To all whom it may concern:*

Be it known that I, EARLE M. CHASE, a citizen of the United States, residing at Springfield, in the county of Hampden and State of Massachusetts, have invented a new and useful Feeding Mechanism for Candy-Coating Machines, of which the following is a specification.

This invention relates to a mechanism for automatically feeding chocolate centers and other similar articles to a chocolate or candy coating machine.

It is the object of my invention to improve the construction of such feeding mechanism, to the end that it may more effectively accomplish the objects for which it is provided.

One important feature of my invention relates to the provision of an improved construction by which the entire feeding hopper is given a straight line transverse movement. A second feature of my invention relates to the provision of improved devices by which the length of stroke and the locus of movement of the hopper may be conveniently adjusted.

Further features of my invention relate to certain arrangements and combinations of parts which will be hereinafter described and more particularly pointed out in the appended claims.

A preferred form of the invention is shown in the drawings, in which

Fig. 1 is a side elevation of my improved feeding mechanism;

Fig. 2 is an end view, partly in section, looking in the direction of the arrow 2 in Fig. 1; and Fig. 3 is a detail end elevation looking in the direction of the arrow 3 in Fig. 1.

Referring to the drawings, I have shown my improved feeding mechanism mounted upon a base or support 10 which in operation is fixed in position at a convenient distance from a chocolate or candy coating machine of any suitable type. A conveyor belt 11 is provided for transporting the chocolate centers or other articles from the feeding mechanism to the coating machine. The belt 11 is driven by a pulley or drum 12 mounted on a shaft 13 rotatable in end bearings 14. The bearings 14 are slidable in guideways 15 and may be adjusted longitudinally therein by adjusting screws 16. In this manner the drum 12 may be moved from the dotted line position indicated in Fig. 1 toward the full line position therein to properly tension the conveyor belt 11.

A worm wheel 18 on one end of the shaft 13 meshes with an elongated worm 19 which is driven through spur gears 20 and 21 from a shaft 22 suitably connected to the driving mechanism of the coating machine. Provision is thus made for driving the drum 12 through positive gear connections in every operative position thereof.

A feeding hopper 25 is movably mounted on a frame 27 which is pivoted at 28 to the upper portion of the base 10. The outer or rear portion of the frame is provided with lugs or depending projections 28$^a$ having pin and slot connections with the upper ends of supporting posts 29 which may be adjustably secured in the base 10 by binding screws 30.

The hopper 25 is secured to a pair of cross rods 31 which are slidable transversely of the machine in anti-friction bearings 32 mounted on the frame 27. The hopper 25 is regularly reciprocated transversely by suitable driving connections from the shaft 22. These connections comprise change gears 33 and 34 slidable but non-rotatable on the shaft 22 and adapted to mesh with gears 35 and 36 on a counter shaft 37 supported in bearings on the base 10.

A disc 38 (Fig. 3) is fastened to the outer face of the gear 36 and is provided with a crank pin 39 which is connected by a link or rod 40 to a stud 41 carried by the hopper 25. The disc 38 is provided with a number of holes 42 which are located at different distances from the axis and which are each adapted to receive the crank pin 39, thus providing a different throw for the rod 40 and a different range of movement for the hopper 25.

The rod 40 has a universal connection to the stud 41 at its upper end and at its lower end is threaded to receive a nut 43 provided with an externally threaded portion which is preferably slightly tapered and which is received in a connecting rod head 44. The internal and external threads of the nut 43 are preferably of the same pitch, so that the nut will move downward on the rod 40 a distance exactly equal to its movement into the member 44.

When it is desired to change the locus of movement of the hopper 25, the nut 43 is turned outward until it is free from the head 44, after which it is adjusted on the rod 40 a distance corresponding to the desired change of locus. The head 44 and nut 43 are then brought into contact and the nut is screwed into the head until it is firmly seated therein, moving downward a corresponding distance on the rod 40 and producing no further change in distance between the crank pin 39 and the stud 41.

A grooved stud 45 (Fig. 1) is threaded into the outer end of the shaft 22 and the groove thereof receives the end of a hooked rod 46 fixed in the gear 34. By screwing the stud 45 in or out, the change gears may be moved into desired engagement to provide a given speed ratio.

Having thus described my invention, it will be seen that I have provided a feeding mechanism in which the hopper may be adjusted at any desired angle corresponding to the nature of the work and in which it will be given a straight line reciprocating movement of any desired extent and in a desired location to feed the work to the conveyor belt 11. Furthermore the speed relation between the reciprocations of the hopper and the movement of the belt may be changed by adjustment of the grooved stud 45.

Having thus described my invention and the advantages thereof, I do not wish to be limited to the details herein disclosed otherwise than as set forth in the claims, but what I claim is:—

1. In a feeding mechanism for a coating machine, a hopper, means to adjust the feeding angle of said hopper, and means to reciprocate said hopper with a straight line movement transversely to the direction of feed.

2. In a feeding mechanism for a coating machine, a hopper, a pair of supporting rods on which said hopper is mounted, bearings for said rods, and means to reciprocate said rods and hopper transversely to the line of feed.

3. In a feeding mechanism for a coating machine, a hopper, means to adjust the feeding angle of said hopper, and means to reciprocate said hopper with a straight line movement transversely to the direction of feed, said reciprocating means being adjustable to vary the extent of reciprocating movement.

4. In a feeding mechanism for a coating machine, a hopper, means to adjust the feeding angle of said hopper, and means to reciprocate said hopper with a straight line movement transversely to the direction of feed, said reciprocating means comprising a connecting rod, a crank disc having holes at different distances from its axis, and a crank pin effective to drive said connecting rod when inserted in any one of said holes.

5. In a feeding mechanism for a coating machine, a hopper, means to adjust the feeding angle of said hopper, and means to reciprocate said hopper with a straight line movement transversely to the direction of feed, said reciprocating means including a connecting rod, a connecting rod head, and a nut threaded on said rod and in said head and having internal and external threads of equal pitch.

6. In a feeding mechanism for a coating machine, a hopper, means to adjust the feeding angle of said hopper, and means to reciprocate said hopper with a straight line movement transversely to the direction of feed, said reciprocating means including a connecting rod, means to reciprocate said connecting rod with a selected length of stroke, and means to vary the length of said connecting rod.

7. In a feeding mechanism for a coating machine, a hopper, a movable frame on which said hopper is mounted for transverse reciprocation, a fixed frame on which said movable frame is pivoted near its front end, and vertically adjustable supports on said fixed frame for the rear end of said movable frame.

In testimony whereof I have hereunto affixed my signature.

EARLE MERRITT CHASE.